United States Patent [19]

Richelmann

[11] 3,728,667
[45] Apr. 17, 1973

[54] CONTACTOR FOR TESTING CIRCUIT MODULES WITH AXIAL LEADS

[75] Inventor: Bernd H. Richelmann, San Diego, Calif.

[73] Assignee: Republic Corporation, Beverly Hills, Calif.

[22] Filed: Mar. 3, 1971

[21] Appl. No.: 120,483

[52] U.S. Cl. ..........339/193 P, 324/158 F, 339/17 C, 339/176 M
[51] Int. Cl. ............................................H01r 13/10
[58] Field of Search................339/17, 176, 192–194, 339/210, 74, 174, 193 VS; 324/158 F

[56] References Cited

UNITED STATES PATENTS

| | | | |
|---|---|---|---|
| 3,325,772 | 6/1967 | Suverkropp | 339/193 R |
| 3,414,869 | 12/1968 | Pascua | 339/193 VS |
| 3,601,699 | 8/1971 | Norton, Jr. et al. | 339/193 VS |

FOREIGN PATENTS OR APPLICATIONS

| | | | |
|---|---|---|---|
| 1,168,346 | 10/1969 | Great Britain | 339/17 R |
| 717,344 | 10/1954 | Great Britain | 339/194 R |
| 782,103 | 9/1957 | Great Britain | 339/193 R |
| 876,357 | 8/1961 | Great Britain | 339/174 |

OTHER PUBLICATIONS

IBM Bulletin, Vol. 13, No. 6, 11/1970, p. 1549

*Primary Examiner*—Marvin A. Champion
*Assistant Examiner*—William F. Pate, III
*Attorney*—Lindenberg, Freilich & Wasserman

[57] ABSTRACT

A contactor head for rapidly making connection with circuit modules which have axially-extending leads that are normally held by a carrier with V-shaped recesses. The head includes a ring-shaped holder with a large aperture for receiving the circle of module leads, and pairs of resilient contactor members spaced about the holder for deflection against the module leads. The contactor members extend through slots in the holder, each slot having an outer wall portion to forcefully deflect the contactor member as the holder is pushed into a housing. The slots are arranged in pairs, with each slot of a pair spaced from the other slot in the direction of sliding of the holder into the housing. The contactor members are in the form of strips, with tapered outer ends for reception in the V-shaped carrier recesses. A compensating board is provided which has a circle of pins for contacting the contactor members, a row of conductors for receiving a standard plug, and jumpers for connecting the pins to the conductors.

6 Claims, 8 Drawing Figures

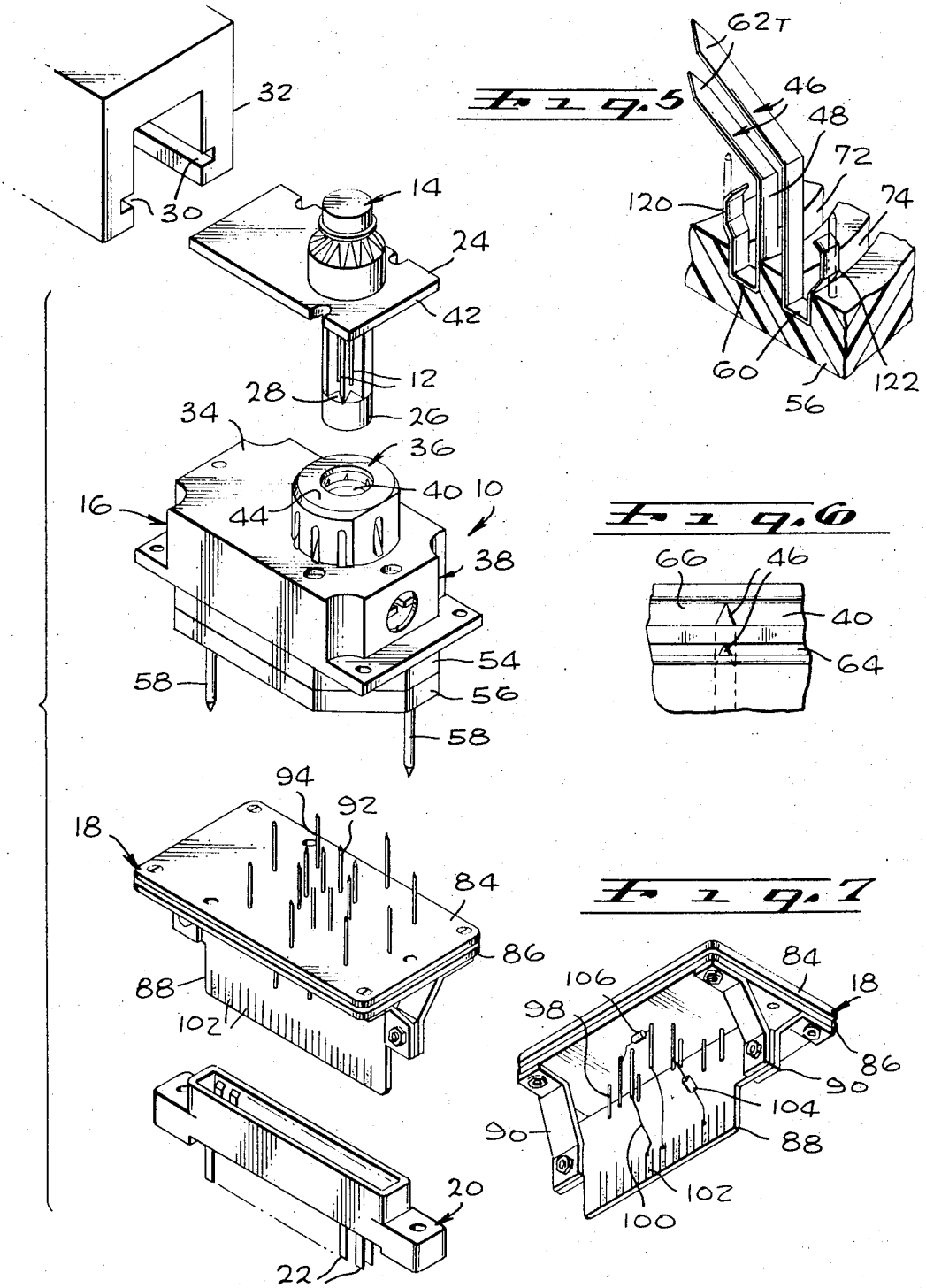

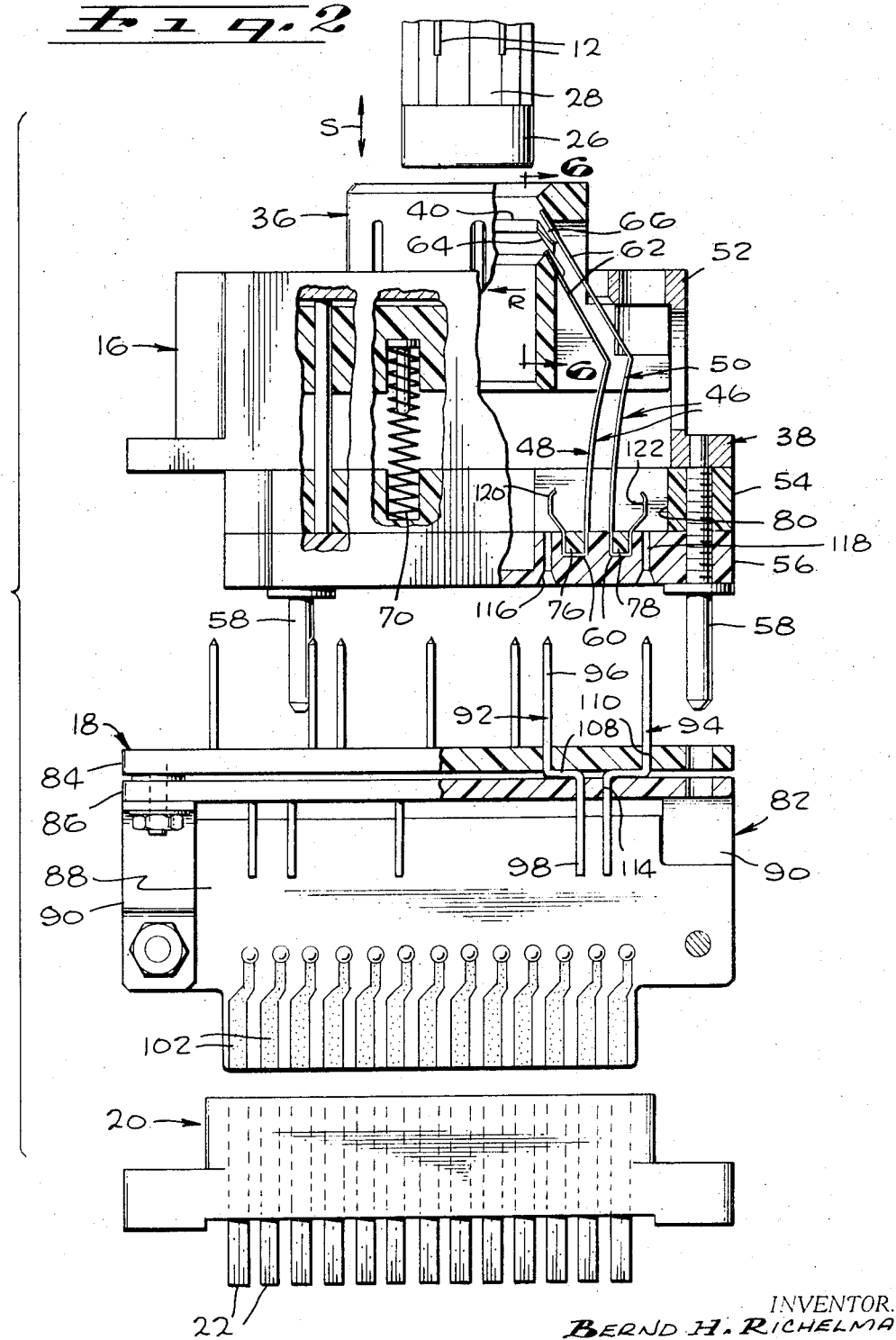

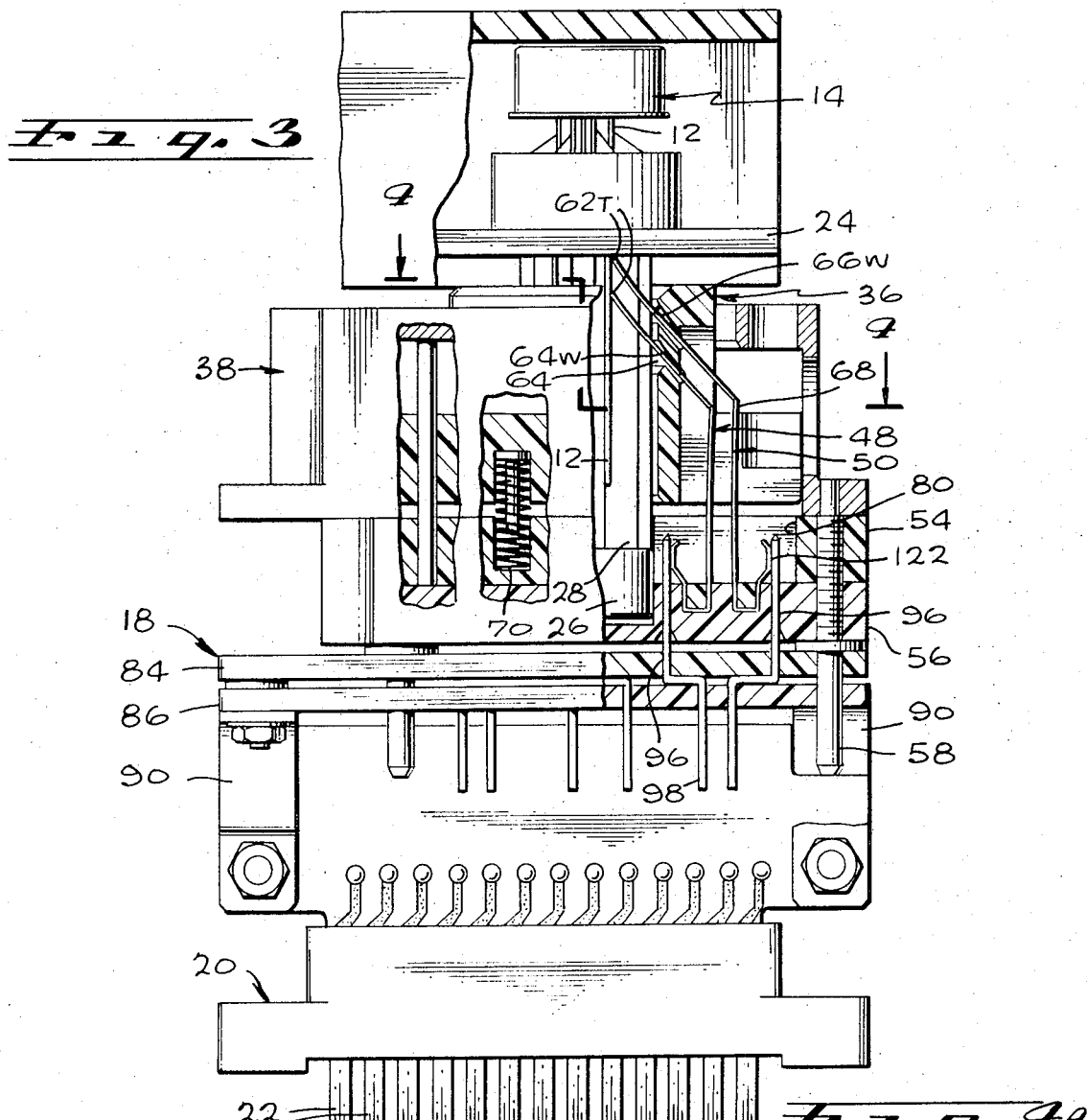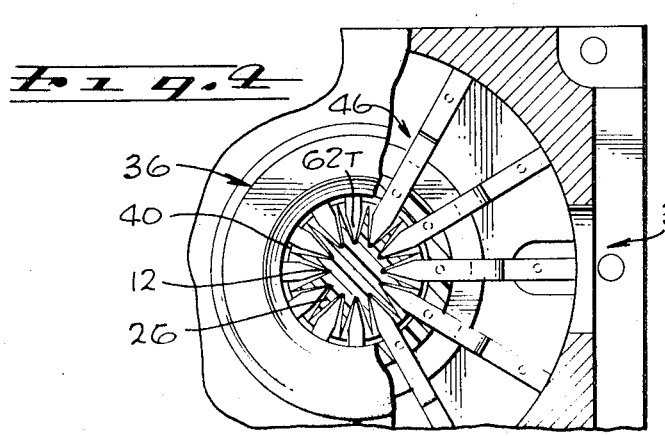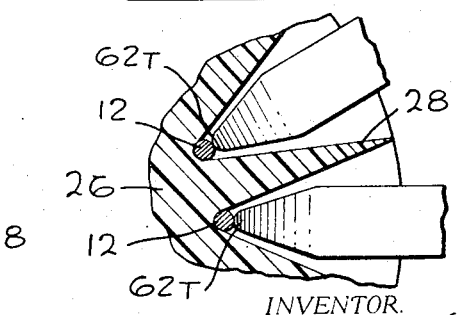

3,728,667

CONTACTOR FOR TESTING CIRCUIT MODULES WITH AXIAL LEADS

BACKGROUND OF THE INVENTION

1. Field of the Invention

This invention relates to contactor heads that make rapid contact with the leads of circuit modules.

2. Description of the Prior Art

Integrated circuit modules can be mass tested by computer controlled test equipment, through the use of contactor heads that quickly receive a circuit module and make contact with its leads. Contactor heads designed to receive circuit modules that have leads arranged in one or more straight rows can utilize a long bar that deflects a row of contacts against the leads. However, it is often more difficult to design test heads to receive circuit modules of the type that have numerous leads arranged in a circle. One difficulty is in assuring deflection of a circle of contacts against the leads, with enough force to assure good electrical contact. Another problem is in assuring that a pair of test contacts will touch each module lead. The latter problem arises partly from the fact that standard carriers for such modules have V-shaped recesses for receiving the leads, and it is difficult to move test contacts into such recesses so that they reliably contact the module leads. Still another problem is in connecting the test contacts, which lie in a circle, to a standard plug of the type that has contacts arranged in rows.

OBJECTS AND SUMMARY OF THE INVENTION

An object of the present invention is to provide a contactor head suitable for testing circuit modules with axially extending leads, which assures reliable and low resistance contact with the leads.

Another object is to provide a simple contactor head for receiving a circuit module having leads arranged in a circle or other non-linear configuration, and for connection to a standard plug which has contacts arranged in a row.

In accordance with one embodiment of the present invention, a contactor head assembly is provided which assures reliable contact with circuit module leads that are arranged in a circle. The assembly includes a housing, a ring-shaped holder slideably mounted in the housing, and pairs of contactor members arranged about the holder. The ring-shaped holder has several pairs of holes circumferentially spaced about it, the holes of each pair spaced from one another in a direction parallel to the direction of sliding of the holder member in the housing. The contactor members have outer portions that extend at an incline through the holes in the holder member. As the holder member is pushed into the housing, the contactor members are forcefully deflected towards the axis of the holder member to contact the circuit module leads.

The circuit modules are normally mounted on a carrier during testing, one standard carrier having tapered or V-shaped recesses and the module leads lying in the recesses. The contactor members are in the form of strips, but they have tapered outer ends to permit reception in the V-shaped recesses.

The test head assembly includes a compensating circuit board apparatus which can hold compensating circuitry adapted for particular model of circuit module that is to be tested. The compensation board assembly includes pins arranged in two circles for plugging into the housing that holds the contactor members and making electrical contact with them. The compensation assembly also includes two rows of conductors for receiving a standard plug, and jumpers for connecting the pins to the conductors. The jumpers can be cut and compensating components connected in their place to construct a desired compensation circuit. Thus, the compensation assembly not only permits the easy installation of circuit components but also transforms the circular layout of contactor members to the row type layout which can be easily plugged into standard connectors.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded perspective view of a test contactor assembly constructed in accordance with the present invention, showing the manner of its connection to a circuit module to be tested;

FIG. 2 is a partially sectional, exploded side view of the contactor assembly of FIG. 1, shown prior to the reception of a circuit module therein;

FIG. 3 is a partially sectional side view of the contactor assembly of FIG. 1, shown assembled and with a circuit module fully inserted therein;

FIG. 4 is a sectional view taken on line 4—4 of FIG. 3;

FIG. 4A is an enlarged partial view of a portion of the apparatus of FIG. 4;

FIG. 5 is a partial perspective view of a pair of contactor members and a housing portion of the contactor assembly of FIG. 3;

FIG. 6 is a view taken on the line 6—6 of FIG. 2; and

FIG. 7 is a bottom perspective view of the compensation apparatus of the contactor assembly of FIG. 1.

DESCRIPTION OF THE PREFERRED EMBODIMENT

FIG. 1 illustrates a test contactor head assembly 10 which is designed to receive and make contact with the leads 12 of an integrated circuit module 14. The assembly includes a contactor head 16 and a plug-in compensating board assembly 18 that is connected to the head 16. A standard connector 20 which is coupled to the board assembly 18, has electrical leads 22 that are connected to a computer test system (not shown). The computer test system feeds test signals through some of the leads 22 and measures signal outputs from other leads 22 to check the performance of the integrated circuit module 14. The purpose of the test head assembly 10 is to provide means for rapidly and reliably connecting the computer leads 22 to the circuit module leads 12.

The circuit module 14 is of the type that has axial leads, these generally being wire type leads arranged in a circle and extending from one end of a case. Such circuit modules may be relatively simple, as where they contain a single transistor, or may be relatively complex, and the number of leads typically ranges from three to 12. The circuit module 14 is held in a carrier 24 that supports the leads 12 and keeps them separated from one another. The carrier 24 has a star lead retainer 26 with several V-shaped recesses 28 that receive the circuit module leads 12. The contactor assembly must establish electrical contact with the leads 12 while they lie at the bottom of the recesses.

In mass production testing, the carrier 24 slides along the slots 30 of a chute section 32 until it hits a stop (not shown) at the end of the chute section. A pneumatic cylinder (not shown) then moves the chute section and the carrier and circuit module therein towards the upper end 34 of the contactor head 16. The contactor head 16 is designed to automatically establish electrical contact with the leads as the chute moves towards it.

The contactor head 16 includes a nose-cone-like holder 36 that is slideably mounted on a housing 38 of the head. The holder 36 has side walls forming a round aperture 40 that can receive the protruding star lead retainer 26 of the module carrier 24. When the carrier 24 is moved towards the contactor head 16, the lead retainer 26 enters the aperture 40. After sufficient inward movement of the carrier 24, a plate 42 thereof presses against the outer surface 44 of the holder to push it into the housing 38. A group of contactor members 46 then automatically enters the recesses 28 of the lead retainer and press against the circuit module leads 12, to thereby connect the module leads to the electrical leads 22 that extend to the computer test system.

As shown in FIG. 2, the contactor members 46 are arranged in pairs which are spaced circumferentially about the central aperture 40 in the contactor head housing 38. Each pair of contactor members includes an inner member 48 and an outer member 50 spaced radially outward from the inner member. The housing 38 includes an upper part 52 and a pair of plate members 54, 56 all held together by three fasteners 58. Each contactor member has an inner end portion 60 held between the plates 54, 56, and an outer portion 62 that extends through holes in the nosecone-like holder 36.

The nosecone-like holder 36 has pairs of holes or slots circumferentially spaced thereabout. Each pair of slots includes an inner slot 64 for receiving an end of an inner contactor member 48, and an outer slot 66 for receiving an end of an outer contactor member 50. The inner and outer slots 64, 66 of a pair are spaced from one another in the direction of sliding of the holder member 36 into and out of the contactor head housing 38, as indicated by the arrow S. The outer portions 62 of the contactor members 48, 50 extend at an incline from the direction of sliding S. As a result, when the holder member 36 slides inwardly, the outer portions 62 of the contactor members move with a radially inward directional component, as indicated by the arrow R into the central aperture 40 where the circuit module leads are located. FIG. 3 illustrates the final position of the inner end portions 62 of the contactor members, when the holder 36 has been fully pushed downwardly or into the housing 38 of the head.

The contactor members 48, 50 are formed so that they tend to extend (when undeflected) approximately as shown in FIG. 3, with a straight portion 68 extending up or outwardly from the inner portion 60, and with the outer portion 62 extending at an incline of about 45° therefrom. The walls of the slots 64, 66 in the holder 36 also extend at an incline of about 45° to pass the contactor members therethrough. It should be noted that each of the slots 64, 66 has an outer wall portion 64W, 66W which can forcefully push against the contactor members to forcefully deflect them so that they press against the circuit module leads to establish good electrical contact therewith. After a test is complete, the circuit module carrier 24 is raised or moved outwardly, to release the holder 36. Four springs 70 then push the holder 36 outwardly to return it to its initial position as shown in FIG. 2. When the holder 36 is in the outward position of FIG. 2, the contactor members 48, 50 are deflected and they tend to move towards the position of FIG. 3. This aids in preventing binding of the contractor members on the walls of the slots 64, 66 when the holder 36 is pushed inwardly.

The fact that the nosecone holder 36 has slots with outer wall portions 64W, 66W, instead of deep recesses in its outer face 44, means that the outer holder face 44 can be made smooth. This is important because the holder 36 is constructed of a wear-resistant and electrically insulative material, and such materials are often brittle. The smooth face 44 resists chipping if it is handled roughly, and in spite of being repeatedly hit by the circuit module carrier during testing.

The contactor members 46 have a strip-like shape, with a width several times as great as the thickness. This could prevent reception of the contactor members in the V-shaped recesses 28 of the star retainer 26. To permit such reception, the outer tips 62T (see FIG. 4 and 4A) of the contactor members are tapered in width. The tapering allows the contactor members to enter the recesses to firmly contact the circuit module leads 12, and yet enables strip-like contactor members to be utilized. Strip-like contactor members are preferable because they resist sideward bending, as compared to a contactor member of round cross section. In addition, the strip shape provides better electrical coupling, particularly for high frequency currents.

The inner ends 60 of the contactor members 48, 50 are tightly held between the plate members 54 and 56. As shown in FIGS. 2, 3 and 5, the lower plate member 56 has a pair of grooves 72, 74, and the inner portions 60 of the contactor members are shaped to fit snugly in these grooves. The upper plate member 54 has a pair of ring-shaped flanges 76, 78 that are shaped to fit into the grooves 72, 74 of the lower plate member and hold the contactor members securely therein. The provision of flanges on one plate member that are received in grooves of the other plate member, and of contactor members formed with looped inner portions to be received between them, permits rapid and accurate assembly of the contactor head in spite of the numerous contactor members that must be held in place. It may be noted that upper plate member 56 has several slots 80, each slot passing a pair of contactor members therethrough and permitting substantial deflection of the contactor members.

The compensating board assembly 18, shown in detail in FIG. 2, is designed for rapid plug-in connection into the contactor head 16. The reason why a separate compensating board assembly 18 is utilized is to enable the same head 16 to be utilized for a variety of different circuit modules, by merely changing the compensating board assembly 18. The compensating board assembly 18 is much less expensive than the contactor head 16, so that it is more economical to utilize a single head and to provide several compensating board assemblies constructed to match the particular circuit modules to be tested.

The board assembly 18 includes a frame 82 formed by a pair of pin-holding boards 84, 86, a transverse board 88, and brackets 90. Two sets of pins 92, 94, arranged in concentric circles, are held between the pin-holding boards. The pins have outer portions 96 which are designed to be plugged into the contactor head 16 to make electrical contact with the contactor members therein. The pins also have inner ends 98 which can be connected by jumpers 100 or the like (FIG. 7) to conductive strips 102 on the transverse board 88. Compensating circuit components such as that shown at 104 can be connected in place of a jumper, while other compensating components such as those shown at 106 can be connected between the pins. The compensating board assembly is designed for rapid connection to the head 16 and for rapid connection to the plug 20 that leads to the computer test system, in addition to providing compensating circuitry for facilitating the tests.

The pins 92 and 94 (FIG. 2) each have center portions 108 connecting their inner and outer portions 96, 98. The inner and outer portions 96, 98 extend parallel to one another but out of alignment, and the center portion 108 extends transverse to the inner and outer portions. The center portion 108 is trapped between the two pin-holding boards 84, 86, while the inner and outer portions extend through holes 110, 114 in the pin-holding boards. This construction allows the pins to be readily installed and firmly held in place. The pins are arranged in two concentric circles, although the inner portions 98 of two pairs of the pins may have to lie out of the circles in order to clear the transverse board 88.

FIGS. 2 and 3 illustrate the manner in which the outer ends of the pins 96 of the compensating board assembly are plugged into the head 16. The lower plate member 56 of the head housing has two sets of pin-receiving holes 116, 118 arranged in concentric circles. The concentric circles of holes 116, 118 match the locations of the two concentric circles of contactor members 48, 50 and of the outer portions 96 of the two concentric circles of pins 92, 94. The inner portions 60 of the contactor members have free ends 120, 122 which are biased to a position in line with the holes 116, 118 in the lower plate member. Accordingly, when the pin ends 96 are inserted fully into the holes 116, 118 they deflect and establish good electrical contact with the free ends 120, 122 of the contactor members. The configuration after insertion is shown in FIG. 3. It may be noted that the outer pin portions 96 extend into the slot 80 of the upper plate member. Thus, the compensating board assembly can be easily plugged into the head to connect compensating circuitry to the contactor members and to translate the circular arrangement of pins to the row arrangement of conductive strips 102 that can receive a standard plug for connection to the computer test system.

Generally, the compensating board assembly 18 is supplied with jumpers 100 (FIG. 7) connecting the inner portion 98 of each pin to conductive strip 102 on the transverse board. The user then adapts the compensating board assembly to a particular circuit module by cutting several jumpers and replacing them with compensating components and by connecting other compensating components between different pins.

Thus, the invention provides a contactor assembly which can receive and quickly make electrical contact with the leads of circuit modules that have leads arranged in a circle. In specialized cases where the leads are arranged along a square or non-circular path, the contactor head can be appropriately modified. The nosecone-like holder has slots for receiving the contactor members to move them with radial directional components into and out of the central aperture where the circuit module leads are received. The slots have outer walls that press against the contactor members when the holder member is being pushed in, to positively deflect the contactor members and assure good electrical contact with the circuit module leads. The housing of the head is constructed with interfitting grooves and flanges for enabling rapid assembly of the contactor members thereon. The compensating board assembly utilizes pins that can be readily plugged into the head, and is constructed to convert from a circular to a linear arrangement of conductors to enable reception in a standard plug.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A head for testing circuit modules with leads comprising:
   a housing assembly;
   a holder member mounted to move in directions into and out of said housing assembly, said holder member having a central aperture and a plurality of holes arranged in pairs about said aperture, each pair of holes including a first hole and a second hole spaced from the first hole substantially in the direction of sliding of the holder member on the housing; and
   a plurality of contactor members, each having an inner end portion mounted on said housing assembly and an outer end portion slideably extending through a corresponding hole in said holder member at an incline with respect to the direction of movement of said holder member on said housing assembly, so that said outer portions move with a directional component perpendicular to the directions of movement of said holder member into said housing, said contactor members being arranged in pairs with each member of a pair extending through a different hole of a pair of holes;
   the walls of said holes in said holder member including outer wall portions for pushing against said contactor members to enable forceful deflection of them as said holder member slides inwardly.

2. A head for testing circuit modules with leads comprising:
   a housing assembly;
   a holder member slideably mounted in said housing assembly, said holder member having side walls defining a central aperture for receiving the leads of a circuit module, and said side walls having a plurality of holes leading to said aperture; and a plurality of contactor members, each having an inner end portion mounted on said housing assembly and an outer end portion slideably extending through a corresponding hole in said holder member at an incline with respect to the direction of slideable movement of said holder member on said housing assembly, to move with a lateral component toward a circuit module lead as said holder member slides into said housing, the walls of said holes including outer wall portions for pushing said contactor members to force them to deflect as said holder member slides inwardly.

3. The head described in claim 2 wherein:

said holes are arranged in pairs about said aperture, with each pair containing a first hole and a second hole spaced from said first hole substantially in the direction of sliding of said holder member on said housing; and said contactor members are arranged in pairs, each member in a pair extending through a different hole of a pair of said holes.

4. The head described in claim 2 wherein:

each of said contactor members has a substantially strip form, with a width at least several times its thickness along most of its length, and with the outer end substantially flat and being tapered in width, whereby to enter a carrier with tapered recesses that hold the circuit module leads.

5. The head described in claim 2 wherein:

said housing includes first and second retainer members with adjacent faces, said first retainer member having a groove and said second retainer member having a flange received in said groove, each of said retainer members having pin receiving holes;

each of said contactor members has a looped inner end portion disposed in said groove and held by said flange therein, and a free innermost portion; and including circuit means including a plurality of pins for projection into said pin-receiving holes to contact said free innermost portions of said contactor members.

6. A head for testing circuit modules of a type which has several leads arranged about a central axis and which are normally held in a carrier lead retainer with several tapered recesses that hold the circuit module leads, comprising:

a housing;

a holder member slideably mounted on said housing, said holder member having a central aperture for receiving said carrier lead retainer and having a plurality of pairs of holes spaced about said aperture, the holes of each pair spaced from one another primarily in the direction of slideing of said holder member; and a plurality of pairs of contactor members having outer end portions extending through said pairs of holes, each contactor member including a strip of resilient electrically conductive material, with a tapered outer end for reception in one of said tapered recesses of said lead retainer.

* * * * *